Oct. 12, 1937.  L. A. HYLAND  2,095,388
ELECTRICAL REGULATOR APPARATUS
Filed Aug. 3, 1935
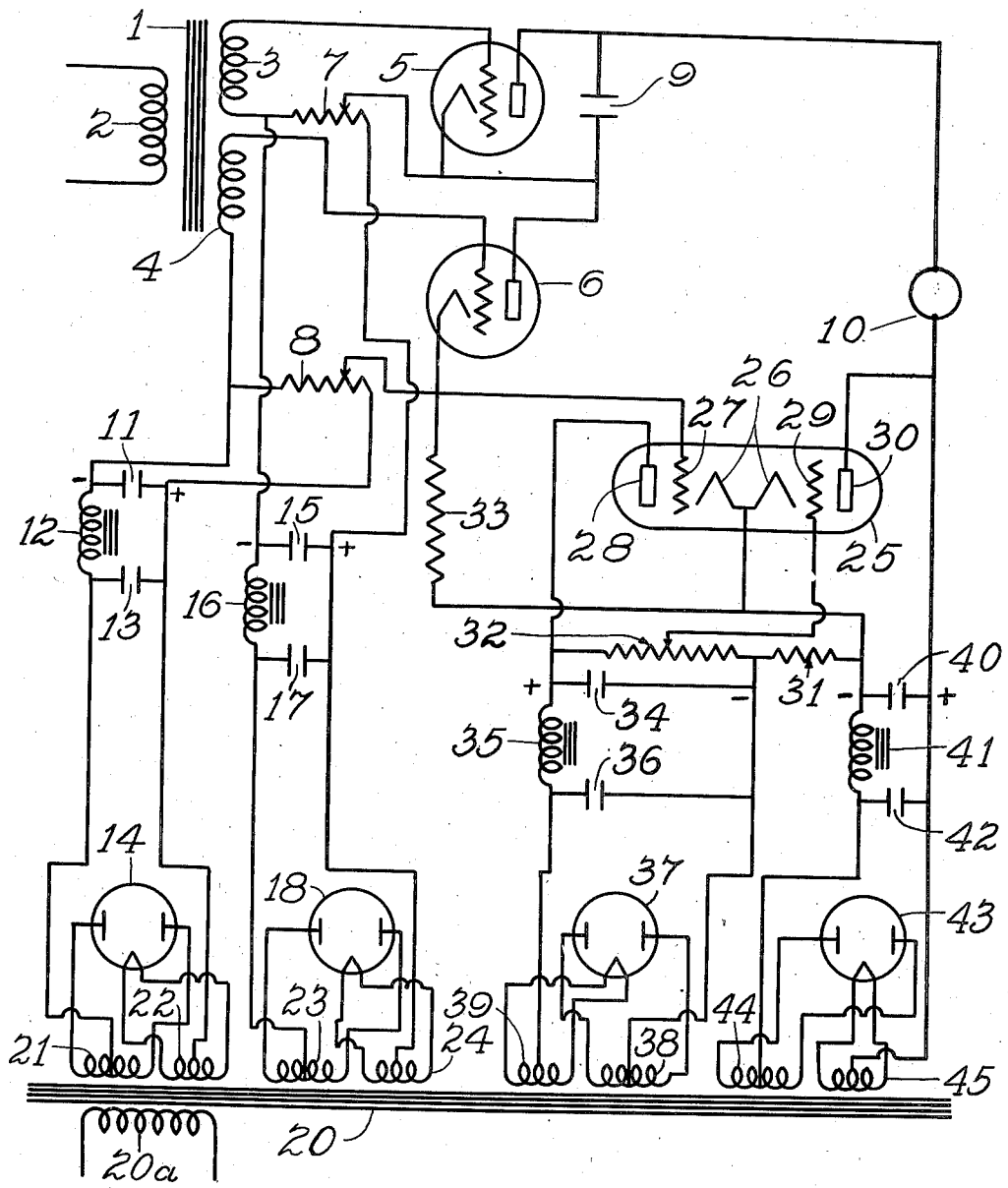

Patented Oct. 12, 1937

2,095,388

UNITED STATES PATENT OFFICE 2,095,388

ELECTRICAL REGULATOR APPARATUS

Lawrence A. Hyland, Washington, D. C., assignor, by mesne assignments, to Bendix Radio Corporation, New York, N. Y., a corporation of Delaware Application August 3, 1935, Serial No. 34,610

5 Claims. (Cl. 171—119)

This invention relates to voltage regulation and more particularly to electric discharge tube circuits for maintaining constant voltage in a frequency indicating system. An object of this invention is to provide novel means for maintaining constant voltage in a metering system throughout a wide frequency range of the voltage source.

Still another object of this invention is to provide a frequency meter employing a pair of electrical discharge devices for regulating and controlling the charging and discharging of an electrostatic capacity at predetermined constant potential and measuring the charging current.

A further object of this invention is to provide a frequency meter employing a pair of electric discharge devices, one of said devices being arranged periodically to charge a condenser from a substantially constant potential source of current supply and the other of said devices being adjusted to discharge said condenser periodically, in such a manner that the average charging current of said condenser is proportional to the rate of charge and discharge.

Other and further objects of this invention will be apparent to those skilled in the art to which it relates from the following specification and the claims.

In accordance with this invention electrical discharge devices are arranged to alternately charge and discharge a condenser at the frequency of any suitable source of voltage. In circuit with these discharge devices is an ammeter through which the charging current flows, and as long as the voltage is maintained constant, the charging current therethrough is proportional to the frequency of the source. In order to maintain the voltage of the charging source constant, electrical discharge means, having a plurality of anode and control grid circuits, are provided, one of the control grids being negatively biased by means of the drop through a resistor in such a manner that when the charging current flows through said resistor, the control grid assumes a positive potential in proportion to the current increase, thereby causing a current increase in an anode-cathode space circuit associated with said control grid. The increase in this anode-cathode current flow acts to negatively bias a second control grid to decrease the space current in a second anode-cathode circuit associated with the second control grid. The anode of this last circuit is connected so as to be common to the charging voltage output and to the charging circuit. As its space current is decreased it draws less current from the source, thus compensating for the voltage variation that would have been caused by the variation in charging current in the absence of this voltage regulating circuit.

A source of substantially constant potential current supply is connected to the condenser and one of the discharge devices for charging the condenser. The potential of the current supply is maintained substantially constant by means of a novel regulator device employing a dual type tube which is connected to the current supply and compensates for voltage fluctuations therein simultaneously as they occur.

The current measuring device is connected in series with the charging side of the condenser and gives a reading proportional to the frequency and the measuring device may be calibrated in terms of frequency, if desired. Likewise in case where the frequency of the condenser charging and discharging control current is known the device of my invention may be used for the accurate determination of electrostatic capacity.

It is also apparent that the measuring device may be used in the discharge circuit of the condenser instead of in the charging circuit.

Other features of this invention will be apparent to those skilled in the art to which it relates from the following specification and drawing in which, briefly, the sole figure illustrates the circuit arrangement of an embodiment of this invention.

Referring to the drawing in detail, reference numeral 1 designates a transformer having primary winding 2 and secondary windings 3 and 4. One side of the secondary winding 3 is connected to the grid or control electrode of the electric discharge tube 5 and the other terminal of this winding is connected to the potentiometer 7. Likewise one side of the winding 4 is connected to the control or grid electrode of the electric discharge tube 6 and the other side is connected to the potentiometer 8. The variable contacts of the potentiometers 7 and 8 are connected to the cathodes of the tubes 5 and 6, respectively.

Sources of biasing potential are connected across each of the potentiometers 7 and 8. These sources each include a filter made up of suitable condensers and chokes and a rectifier tube connected to windings of a transformer. A single transformer 20, having a primary 20a may be employed to furnish power for all of the rectifiers, as illustrated, or separate transformers may be employed, if desired, for each of the rectifiers.

Condensers 11 and 13 are connected to the choke coil 12 to filter the rectified output of the tube 14 and impress it across the potentiometer 8 to furnish the bias potential for the tube 6. The secondary winding 21 of the transformer 20 furnishes the high potential that is rectified by the full wave rectifier tube 14 and the secondary winding 22 furnishes the filament current for this rectifier tube.

In like manner the condensers 15 and 17 and the choke coil 16 filter the rectified alternating current output of the tube 18 which is connected to the high potential secondary winding 24 of the transformer 20.

It is, of course, obvious that any type of direct current supply, such as, batteries, motor generator and the like may be employed as sources of bias potential for the tubes 5 and 6 instead of the type of supply shown. Also different forms of rectifiers, such as, the dry conduction contact type, the electrolytic type, the vibratory or rotary contact type, the mercury vapor type and the like may be employed, if desired, instead of the form illustrated.

A condenser 9 is connected across the tube 5 between the cathode and anode of this tube. The cathode of tube 5 is connected to the anode of tube 6. A dual type tube 25 is employed as a voltage regulating compensator to maintain the voltage used for charging the condenser 9 substantially constant even though the load applied to the source of current supply may vary.

The cathodes 26 of the tube 25 are connected together and to the resistors 31 and 33. The other end of the resistor 33 is connected to the grid 27 of the tube 25 and to the cathode of the tube 6. Grid 29 is connected to the variable contact of potentiometer 32 which is connected to the resistor 31 and to the anode 28. Anode 30 is connected to the condenser 9 through the current measuring device 10 and to the positive terminal of the condenser charging current supply.

Rectifier tube 37 is connected to the high potential secondary winding 38 and filament winding 39 for the purpose of rectifying the alternating current delivered to it by the winding 38 and impressing the rectified potential on the filter which comprises the condensers 34 and 36 and the choke coil 35. The output of this filter is impressed across the potentiometer 32.

The condenser 9 charging current source of current supply is obtained from the high potential winding 44 which is connected to the anodes of the full wave rectifier tube 43. A filament supply secondary winding 45 is connected to the filament of this rectifier tube. The filter comprising the condensers 40 and 42 and the choke coil 41, is connected to filter output of the rectifier tube 43. The output of this filter is connected to the resistor 31 and to the anode 30 of tube 25 and the measuring device 10.

The operation of the circuit arrangement of my invention is as follows: The secondaries 3 and 4 are connected to the tubes 5 and 6 in opposite phase relationship and when the terminal of secondary 3 connected to the control electrode of tube 5 is positive the terminal of secondary 4 connected to the control electrode of tube 6 is negative. The potentiometers 7 and 8 are adjusted to bias the control electrodes of tubes 5 and 6, respectively, to permit current to flow through these tubes only during the intervals when the terminals of the secondaries 3 and 4, connected to the control electrodes of these tubes, are positive by virtue of the potential set up in these windings from the primary circuit. It is, of course apparent that the potentiometer 7, for example may be adjusted to impress a negative potential on the control electrode of tube 5 in excess of the instantaneous positive value of the potential across the secondary 3 and if the tube 5 is of the type in which current will flow between the anode and cathode even when the grid or control electrode is negative with respect to the cathode, the tube would function to accomplish its purpose. The purpose of biasing the control electrodes of tubes 5 and 6 negatively is to permit these tubes to function as current conducting devices only during alternate half cycles of the alternating potentials developed in the secondaries 3 and 4.

The tube 6 functions, when the negative biasing potential of the control electrode thereof is decreased through the operation of the secondary 4, to permit a current to flow between the cathode and anode thereof, to charge the condenser 9. The charging current for the condenser 9 flows through rectifier tube 43 from the secondary 44 and through the resistor 33 to the cathode of tube 6. This current also flows through the meter 10.

When the tube 6 is rendered non-conductive the tube 5 is rendered conductive through the operation of the secondary 3 and the condenser 9 is discharged through the cathode-anode path of the latter tube.

The cycle of operation is then repeated, that is, the condenser is again charged through the tube 6 and discharged through tube 5. Each time the charging current passes through the meter 10 and the average value of the charging current is indicated by this meter.

It is apparent that another meter, similar to meter 10, may be connected between the anode of tube 5 and the condenser 9 to measure the discharging current only and thus a check in the reading of meter 10 may be obtained.

The meter 10 is calibrated in terms of frequency inasmuch as its reading is proportional to the frequency of the potential applied to the primary 2 of the transformer, and the frequency of this potential may be read from this meter direct.

The charging current flowing through the resistor 33 impresses a positive potential on the grid 27 of tube 25, which is proportional to the current flow through this resistor, and renders the path between the cathode 26 and the anode 28 more conductive. This causes current of greater magnitude to flow through the resistor 32 because of the increased conductivity of the path between the cathode 26 and the anode 28 and also causes an increased current to flow through the resistor 31. The increase in current through the resistor 31 results in the grid 29 becoming more negative with respect to the cathode 26 and as a consequence the anode 30, which is supplied with current by the rectifier 43, draws less current. The amount of the decrease in current between the cathode 26 and the anode 30 is exactly the same as the increase of anode current through the tube 6. The regulator thus functions to keep the potential of the source of current supply, feeding the condenser 9 through the tube 6, constant.

This is an important feature, particularly where the filter chokes, for example choke 41, employed with the rectifiers are relatively high resistance and cause an increase in potential drop as the current through them increases. The current drawn through the choke 41 increases as the frequency impressed on the primary 2 increases. Consequently in the absence of a voltage regulator, such as the tube 25 and associated apparatus, the voltage of the condenser 9 charging source would decrease as the frequency, being measured, increased.

While there has been described one embodiment of the invention in detail, it is apparent that various changes will occur to those skilled in the art. The invention is therefore not to be limited by the drawing and specification, but by the scope of the appended claims.

What I claim and desire to secure by Letters Patent of the United States is as follows:

1. A regulator comprising electrical discharge device means having a low potential electrode, first and second grid electrodes, and first and second anodes, a resistor for passing a load current connected between said second grid electrode and said low potential electrode, means for connecting a source of current supply for furnishing a load current between said low potential electrode and said first anode, a resistor connected between said low potential electrode and said second anode, a second source of current supply connected to said last mentioned resistor and connections between said last mentioned resistor and said first grid for impressing a potential on said last mentioned grid and for controlling the current flow to said first anode for maintaining the load on said first mentioned source of current supply substantially constant.

2. A regulator comprising a dual type tube having a cathode, a pair of grid electrodes and a pair of anodes, a first source of current supply, a second source of current supply, said first source of current supply being connected between said cathode and one of said anodes, said second source being connected between said cathode and the other of said anodes, means for impressing a potential on one of said grid electrodes derived from said second source of current supply, connections for impressing a potential on the other of said grid electrodes derived from said first source of current supply, and means for varying said last mentioned potential in accordance with a load current.

3. A regulator comprising electric discharge device means having a first and a second discharge path, each of said discharge paths including a cathode, grid and anode, a source of potential connected across said first discharge path and to the grid electrode of said second discharge path, means for applying a potential tending to vary in accordance with a predetermined load, to said second discharge path and means for applying a potential directly proportional to said predetermined load to the grid electrode associated with said first discharge path whereby the potential tending to vary in accordance with the predetermined load is maintained substantially constant.

4. A voltage regulator comprising an electrical discharge device having a first anode and a second anode, a first grid and a second grid and a cathode, a source of current supply, connections between said source of current supply, said first anode and said cathode, a potentiometer connected between said cathode and said second anode, said potentiometer having a variable contact connected to said first grid electrode, a second source of current supply connected to said potentiometer for controlling the potential of said first grid, a resistor connected between said second grid electrode and said cathode for controlling the potential of said last mentioned grid and means for controlling the potential drop across said last mentioned resistor in accordance with a load current.

5. A voltage regulator comprising an electrical discharge device having a pair of anodes, a pair of grid electrodes, and a common cathode, a source of current supply, connections between said source of current supply and one of said anodes and said cathodes, a potentiometer connected between said cathode and the other of said anodes, said potentiometer having a variable element connected to the grid electrode associated with said anode connected to said current supply, a second source of current supply connected to said potentiometer for controlling the potential of said last mentioned grid and a resistor connected between the other of said grid electrodes and said common cathode for controlling the potential of said last mentioned grid.

LAWRENCE A. HYLAND.